United States Patent Office 3,183,256
Patented May 11, 1965

3,183,256
S - [(ARYLTHIO)(PHOSPHINYL)METHYL] PHOSPHORUS ESTERS AND PROCESS FOR PREPARING SULFUR-CONTAINING ORGANIC PHOSPHORUS COMPOUNDS
Gail H. Birum, Dayton, Ohio, assignor to Monsanto Company, a corporation of Delaware
No Drawing. Filed Jan. 3, 1961, Ser. No. 80,034
14 Claims. (Cl. 260—461)

The present invention relates to sulfur-containing organic compounds of phosphorus. More particularly, this invention relates to phosphinyl-substituted derivatives of phosphorothioic, phosphonothioic and phosphinothioic acid esters.

It is an object of this invention to provide new and useful sulfur-containing organic compounds of phosphorus. It is another object of this invention to provide methods for preparing the new sulfur-containing organic compounds of phosphorus. It is yet another object of this invention to provide new insecticidal compositions and methods for destroying insects which comprises applying a composition containing a carrier adjuvant and as an essential active ingredient one of the phosphinyl-substituted derivatives of phosphorothioic, phosphonothioic, or phosphinothioic acid esters described herein. Other objects and advantages of this invention will become apparent from a consideration of the accompanying disclosure and the appended claims.

In accordance with this invention there are provided, as new compounds, sulfur-containing organic compounds of phosphorus having the structure,

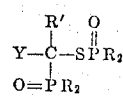

wherein R is selected from the group consisting of hydrocarbyl, hydrocarbyloxy, and halohydrocarbyloxy radicals having from 1 to 6 carbon atoms; R' is selected from the group consisting of hydrogen, chlorine, bromine, and alkylthio, arylthio, and alkarylthio radicals having from 1 to 15 carbon atoms, and chlorine and bromine-substituted derivatives thereof; and Y is a radical selected from the group consisting of

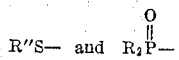

wherein R" is selected from the group consisting of aryl, chloroaryl, bromoaryl, and alkylaryl radicals having from 6 to 12 carbon atoms.

Further, in accordance with this invention, compounds having the above general formula are prepared by reacting a phosphoranoate ester of the formula,

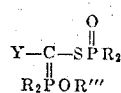

wherein R and Y are as defined above, and R''' is selected from the group consisting of aliphatic and halogen-substituted aliphatic radicals having from 1 to 6 carbon atoms, with a halogen-containing reactant having a general formula selected from the group consisting of HX, $X_2$ and ASX, wherein X is selected from the group consisting of bromine and chlorine, and A denotes an alkyl radical, branched or straight-chain, having from 1 to 15 carbon atoms, chlorine- and bromine-substituted derivatives thereof, aryl and alkaryl radicals having from 6 to 12 carbon atoms in the ring and from 1 to 15 carbon atoms total and chlorine- and bromine-substituted derivatives thereof.

The reaction of triphosphorus phosphoranoate esters with halogen-containing reactants proceeds according to the following general equation:

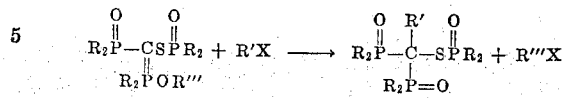

wherein R, R', and R''' are as defined above. Examples of this type of reaction are:

(a) Reaction of hydrogen chloride with triethyl [(diethoxyphosphinyl) (diethoxyphosphinylthio) methylene] phosphoranetrioate to obtain diethyl S-[bis(diethoxyphosphinyl)methyl]phosphorothioate:

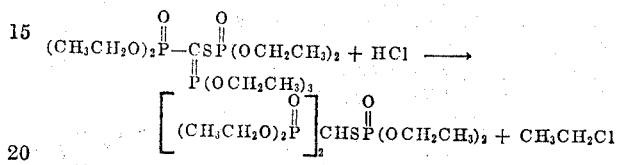

(b) Reaction of chlorine with bis(2-chloroethyl){[2-chloroethoxy)phenylphosphinyl][(2-chloroethoxy)phenylphosphinylthio]methylene}phenylphosphoranedioate to obtain 2-chloroethyl S-{bis[2-chloroethoxy)phenylphosphinyl]chloromethyl}phenylphosphonothioate:

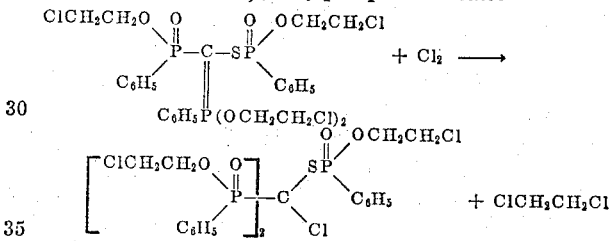

and (c) reaction of pentachlorobenzenesulfenyl chloride with triethyl [(diethoxyphosphinyl) (diethoxyphosphinylthio)methylene]phosphoranetrioate to obtain diethyl S-[bis(diethoxyphosphinyl) (pentachlorophenylthio) methyl]phosphorothioate:

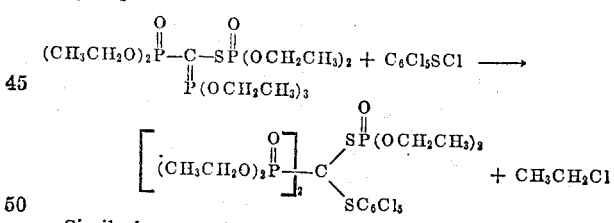

Similarly, reaction of diphosphorus phosphoranoate esters with halogen-containing reactants proceeds according to the following general equation:

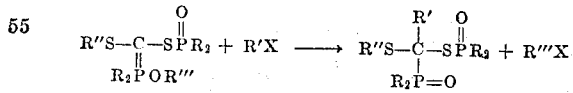

wherein R, R', R'', and R''' are as defined above. Specific examples are:

(a) Reaction of tris(2-bromopropyl){(pentachlorophenylthio)[bis(2 - bromopropoxy)phosphinylthio]methylene} phosphoranetrioate with hydrogen bromide to obtain bis(2-bromopropyl) S-{(pentachlorophenylthio)[bis(2-bromopropoxy)phosphinyl]methyl}phosphorothioate:

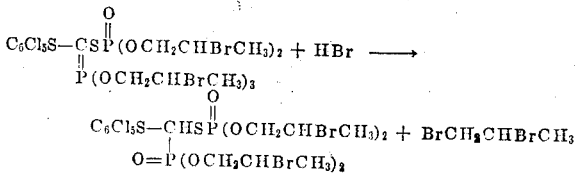

(b) Reaction of diethyl [(p-tolylthio)(ethoxyethylphosphinylthio)methylene]ethylphosphoranedioate with bromine to obtain ethyl S-[(p-tolylthio)(ethoxyethylphosphinyl)bromomethyl]ethylphosphonothioate:

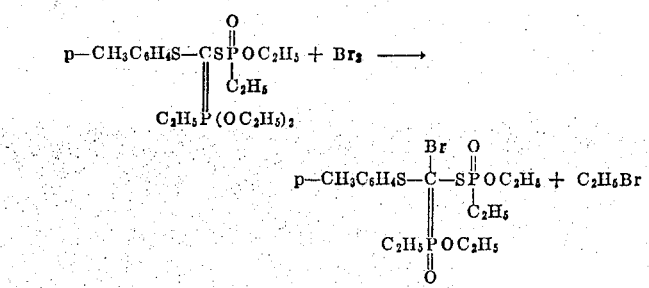

(c) Reaction of trimethyl [(2,4-dibromophenylthio)(dimethoxyphosphinylthio)methylene]phosphoranetrioate with dichloromethanesulfenyl chloride to obtain dimethyl S-[(2,4-dibromophenylthio)(dimethoxyphosphinyl)(dichloromethylthio)methyl]phosphorothioate

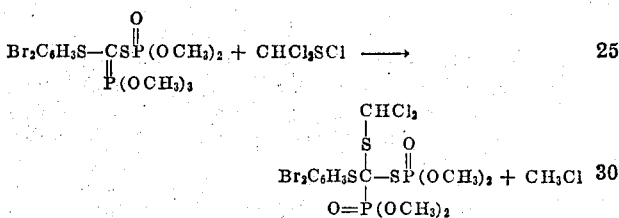

The reaction which occurs according to the process of this invention is believed to proceed according to the following general equation wherein hydrogen chloride is used as an exemplary halogen-containing reactant:

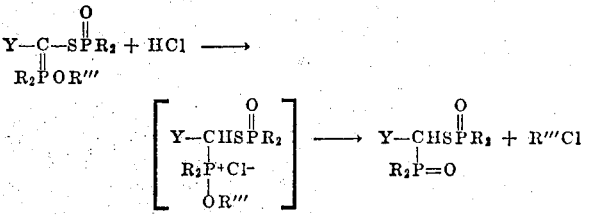

The reactions of phosphoranoate esters of the above defined types with hydrogen bromide, hydrogen chloride, bromine, chlorine, and sulfenyl chlorides and bromides, as defined above, are believed to proceed according to similar mechanisms. Thus, as a result of the reaction of this invention, the carbon to phosphorus double bond of the phosphoranoate ester is eliminated and the ester gives up one aliphatic or haloaliphatic group which combines with a bromine or chlorine atom from the halogen-containing reactant to form a halohydrocarbon by-product, and the residue of the halogen-containing reactant becomes bonded to the methylene carbon atom of the original phosphoranoate ester.

The phosphoranoate esters which are used as starting materials for preparing the compounds of this invention may themselves be prepared by reacting a triorgano ester of a trivalent phosphorus acid having at least one aliphatic or halogen-substituted aliphatic radical of from 1 to 6 carbon atoms bonded through oxygen to the phosphorus atom with certain sulfur- and halogen-containing compounds. When such an ester, e.g., tris(2-bromoethyl) phosphate, is reacted with a member of the group consisting of thiophosgene and a trichloromethyl sulfur compound of the formula, $CCl_3SZN$, in which Z is oxygen or sulfur and N is an organic radical having a molecular weight of up to about 300 and which is bonded to the Z atom through a carbon atom thereof, there is obtained as product a phosphoranoate ester having a carbon to phosphorus double bond and three phosphorus atoms, our example thus having the structure,

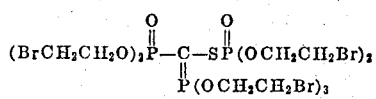

When a triorgano trivalent phosphorus ester of the above defined type, e.g., triethyl phosphite, is reacted with an aryl, haloaryl, or an alkaryl chlorodithioformate, i.e., a compound of the formula $$R''S\overset{S}{\overset{\|}{C}}Cl$$

where $R''$ is as defined above, e.g., phenyl chlorodithioformate, the phosphoranoate ester obtained has the structure,

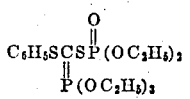

which contains a carbon to phosphorus double bond and two pentavalent phosphorus atoms. The preparation of the phosphoranoate esters used as starting materials in this invention, and the materials from which they are made are described in applicant's copending applications, Serial No. 21,132, filed April 11, 1960, now U.S. Patent 3,058,-876, and Serial No. 39,239, filed June 28, 1960, now U.S. Patent 3,089,891, which are incorporated herein by reference.

Illustrative examples of phosphoranetrioate ester starting materials containing three phosphorus atoms which are obtained by reacting a triorganic phosphite ester and either thiophosgene or a trichloromethyl sulfur compound of the formula, $Cl_3CSZN$, as defined above, are:

Tributyl[(dibutoxyphosphinyl)(dibutoxyphosphinylthio)methylene]phosphoranetrioate,
Tris(2-bromoethyl){[bis(2-bromoethoxy)phosphinyl]-[bis(2-bromoethoxy)phosphinylthion]methylene}-
Bis(3-hexynyl){(biphenylthio)[(3-hexylyloxy)(3-hexynyloxyphosphenylthio)methylene]phosphoranetrioate,
Diethyl hexyl[(ethoxyhexyloxyphosphinyl)(ethoxyhexyloxyphosphenylthio)methylene]phosphoranetrioate,
Triallyl[(diallyloxyphosphinyl)(diallyloxyphosphinylthio)methylene]phosphoranetrioate, and
Tris(2-butynyl){[bis(2-butynyloxy)phosphinyl][bis-(2-butynyloxy)phosphinylthio]methylene}phosphoranetrioate.

Phosphoranedioate ester starting materials containing three phosphorus atoms and obtained by using phosphonite esters are, e.g., Diethyl[(ethoxypropylphosphinyl)(ethoxypropylphosphinylthio)methylene]propylphosphoranedioate,
4-chlorohexyl phenyl[(phenoxyphenylphosphinyl)(phenoxyphenylphosphinylthio)methylene]}phenylphosphoranedioate,
Bis(2-chloropropyl){[(2-chloropropoxy)allylphosphinyl][(2-chloropropoxy)allylphosphinylthio]methylene} allylphosphoranedioate,
Diamyl[(amyloxycyclohexylphosphinyl)(amyloxycyclohexylphosphinylthio)methylene]cyclohexylphosphoranedioate,
Dially[allyloxyphenylphosphinyl)(allyloxyphenylphosphinylthio)methylene]phenylphosphoranedioate, and
Bis(2-butynyl){[(2-butynyloxy)hexylphosphinyl][(2-butynyloxy)hexylphosphinylthio]methylene}hexylphosphoranedioate.

Illustrative examples of phosphoranoate ester starting materials containing three phosphorus atoms and obtained by reacting phosphinite esters with thiophosgene or a compound, $Cl_3CSZN$, as defined above, are:

Methyl[(dimethylphosphinyl)(dimethylphosphinylthio)-methylene]dimethylphosphoranoate, 2-chloroethyl{[bis(3-hexenyl)phosphinyl][bis(3-hexenyl)phosphinylthio]methylene}bis(3-hexenyl)phosphoranoate,
Propyl[(diphenylphosphinyl)(diphenylphosphinylthio)methylene]diphenylphosphoranoate,
2-bromopropyl[(dipropylphosphinyl)(dipropylphosphinylthio)methylene]dipropylphosphoranoate,
Allyl[(diethylphosphinyl)(diethylphosphinylthio)methylene]diethylphosphoranoate, and
Propynyl[(diphenylphosphinyl)(diphenylphosphinylthio)methylene]diphenylphosphoranoate.

Illustrative examples of phosphoranetrioate ester starting materials containing two phosphorus atoms, as defined above, and obtained by reacting phosphite esters with a chlorodithioformate compound are:

Trimethyl[(phenylthio)(dimethoxyphosphinylthio)methylene]phosphoranetrioate,
Tris(2-chlorobutyl){(p-chlorophenylthio)[bis(2-chlorobutoxy)phosphinylthio]methylene}phosphoranetrioate,
Triallyl[(p-tolylthio)(diallyloxyphosphinylthio)methylene]phosphoranetrioate,
Tris(2-butynyl){(pentachlorophenylthio)[bis(2-butynyloxy)phosphinylthio]methylene}phosphoranetrioate, and
Bis(2-chloro-3-pentenyl)propyl{(phenylthio)[bis(2-chloro-3-pentenyloxy)phosphinylthio]methylene}phosphoranetrioate.

Phosphoranedioate ester starting materials obtained by reacting the chlorodithioformate compound with a phosphonite ester are, e.g., Diethyl[(p-bromophenylthio)(ethoxyphenylphosphinylthio)methylene]phenylphosphoranedioate,
Dihexyl[(xylylthio)(hexyloxyhexylphosphinylthio)methylene]hexylphosphoranedioate,
Bis(2-bromopropyl){(naphthylthio)[(2-bromopropoxy)propylphosphinylthio]methylene}propylphosphoranedioate,
Cyclohexyl ethyl[(phenylthio)(cyclohexyloxyethylphosphinylthio)methylene]ethylphosphoranedioate,
Bis(2-butenyl){(p-iodophenylthio)[(2-butenyloxy)(2-butenyl)phosphinylthio]methylene}(2-butenyl)phosphoranethioate, and
Bis(3-hexynyl){(biphenylthio)[(3-hexyloxy)(3-hexynyl)phosphinylthio]methylene}(3-hexynyl)phosphoranedioate.

Similarly, phosphoranote esters derived from phosphinite esters and chlorodithioformate reactants as defined above may also be used to prepare compounds within the scope of this invention. Examples of such compounds are:

Propyl[(phenylthio)(dipropylphosphinylthio)methylene]dipropylphosphoranoate,
2-chlorobutyl[(naphthylthio)(diphenylphosphinylthio)methylene]diphenylphosphoranoate,
Allyl[(p-chlorophenylthio)(diallylphosphinylthio)methylene]diallylphosphoranoate, and
Amyl{(p-tolylthio)[bis(2-pentynyl)phosphinylthio]methylene}bis(2-pentynyl)phosphoranoate.

The hydrogen bromide, hydrogen chloride, bromine and chlorine reactants used to prepare compounds of this invention are readily obtainable materials. The sulfenyl halides, i.e., those having the formula ASX, where A is selected from the group consisting of alkyl, chloroalkyl, bromoalkyl radicals having from 1 to 15 carbon atoms, and aryl, chloroaryl, bromoaryl radicals having from 6 to 12 carbon atoms and alkaryl, chloroalkaryl and bromoalkaryl radicals having from 7 to 15 carbon atoms, are illustrated by the following examples: methyl-, ethyl-, propyl-, isopropyl-, butyl-, tert-butyl-, amyl-, hexyl-, 2-ethylhexyl-, octyl-, decyl-, dodecyl-, tetraisopropyl-, triiso- butyl-, tetradecyl-, and pentadecylsulfenyl chlorides and bromides; the chlorinated and brominated derivatives thereof, e.g., trichloromethyl-, tribromomethyl-, dichloromethyl-, 2-chloroethyl-, 2-bromopropyl-, 2,4-dichlorobutyl-, 3-bromopentyl-, 2,6-dichlorohexyl-, 10,11-dibromodecyl-, 4,4,6-trichloropentadecylsulfenyl chlorides and bromides; the arylsulfenyl chlorides and bromides, e.g., benzenesulfenyl chloride, naphthylenesulfenyl chloride, and biphenylenesulfenyl bromide; the alkarylsulfenyl chlorides and bromides, for example, toluenesulfenyl bromide, 2,4-xylenesulfenyl chloride, mesitylenesulfenyl bromide; as well as the chlorinated and brominated derivatives thereof, e.g., 2,4-dibromobenzenesulfenyl chloride, pentachlorobenzenesulfenyl chloride, 2-chloro-4-methylbenzenesulfenyl chloride, 2,4,5,7-tetrabromonaphthylsulfenyl bromide, 2,2',4,4'-tetrachlorobiphenylylsulfenyl chloride, etc.

Formation of the desired product, that is, a phosphinyl-substituted derivative of a thiophosphorus acid ester of the above defined type, is accompanied by the formation of a halohydrocarbon by-product. Thus, the reaction of, say, triisopropyl [(pentachlorophenylthio)(diisopropoxyphosphinylthio)methylene]phosphoranetrioate with chlorine yields isopropyl chloride as a by-product:

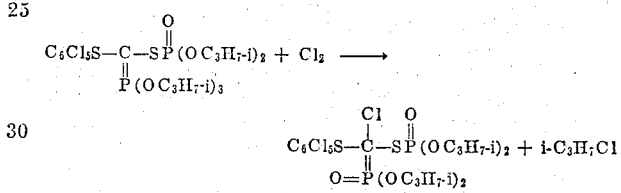

The by-product halogenated hydrocarbons are generally articles of commerce for which many applications exist. Thus, while many currently employed processes for the manufacture of organic compounds of phosphorus entail substantial waste of halogen in that by-products of little commercial importance are formed, in the present process all of the halogen constituent of the raw materials is converted to products of economic importance.

In general, reaction of phosphoranoate esters of the above defined types with hydrogen bromide, hydrogen chloride, chlorine, bromine, or a sulfenyl chloride or bromide as described above occurs readily at ordinary, decreased, or increased temperatures within the range of about 0° C. to about 150° C., with temperatures on the order of from 0–75° C. being preferred in most cases. Although cooling is not necessary, once the reaction has started, it is usually preferred to apply some cooling to minimize the formation of decomposition products that might result from operation at unnecessarily high temperatures. When employing the more reactive compounds, reaction may be essentially complete at ordinary temperatures or below, but it is usually preferred to apply external heating after the initial exothermic reaction has subsided. The degree of heating will depend upon the nature of the reactants but will generally vary to below the decomposition point of the reaction mixture. Temperatures of up to 150° C. may be useful when employing the less reactive starting materials. In some instances, particularly when employing the more reactive phosphoranoate esters and/or solid reactants, the use of an inert solvent or diluent is advantageous. Such inert solvents or diluents may be, for example, benzene, hexane, xylene, ether, etc. While the reactants are advantageously employed in stoichiometric proportions, such proportions need not be employed since any unreacted material is readily recovered from the reaction products.

The present thiophosphorus acid esters are stable, well-defined compounds which range from viscous liquids to waxy or crystalline solids. They may be advantageously employed for a variety of industrial purposes, but are particularly useful as the active ingredient in insecticidal compositions. As herein shown, the present compounds are particularly toxic to mites and leaf-feeding insects when applied as a spray admixed with a liquid or solid carrier adjuvant. They also possess significant systemic action. When using the compounds of the present invention in insecticidal compositions or in other applications, removal of the by-products of the reaction may be unnecessary. In fact, there may be advantages in retaining the by-products in the major product.

Other applications in which the products of the present invention are useful are as oil additives, gasoline additives, antioxidants, stabilizers, and fire-retardant additives for various polymer systems.

For use as insecticides, the present sulfur-containing pentavalent phosphorus esters are advantageously applied in oil-in-water emulsions. The word "oil" is here used to designate any organic liquid which is insoluble in water. Emulsifying agents which may be employed are those used in the art for the preparation of oil-in-water emulsions. Examples of emulsifying agents which may be used include long-chained alkylbenzenesulfonates, polyalkylene glycols, long-chained alkyl sulfosuccinates, etc. However, for these and related biological toxicant purposes, these phosphorus compounds may be incorporated into inert carriers generally. Thus, they may be mixed with solid carriers such as clay, talc, pumice and bentonite to give toxicant compositions which may be applied as dusts. It has been found, however, that the emulsions possess an improved tendency to adhere to treated surfaces so that less of the active ingredients, i.e., the sulfur-containing pentavalent phosphorus esters of this invention, is required when applied in emulsion form.

The invention is further illustrated, but not limited, by the following examples.

*Example 1*

This example illustrates the preparation of one type of phosphoranoate starting material as well as the process of preparing a compound of this invention.

A 27.1 g. (0.075 mole) portion of pentachlorophenyl chlorodithioformate and 75 ml. of benzene were placed in a 500 ml. flask and stirred as 26.6 g. (0.16 mole) of redistilled triethyl phosphite was added in about 2 minutes. The temperature increased spontaneously to 47° C. The reaction mixture was stirred for 0.75 hour and then warmed to 70° C. Most of the benzene was removed under water pump vacuum. The residue crystallized to a yellow solid. This was recrystallized from hexane to obtain 38.0 g. of a light yellow solid, M.P. 106–107° C., which was triethyl [(pentachlorophenylthio)(diethoxyphosphinylthio)methylene]phosphoranetrioate,

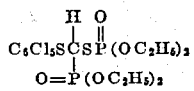

A solution of 12.6 g. (0.02 mole) of the above product in 50 ml. of benzene was treated with anhydrous hydrogen chloride at 3–10° C. until there was no longer heat of reaction and hydrogen chloride was passing through a condenser which was part of the apparatus used. The reaction mixture was concentrated to 110° C./0.5 mm., and the residue was recrystallized from hexane to give 10.7 g. (89% yield) of a white solid, M.P. 72–73° C., having nuclear magnetic phosphorus resonance absorptions of about equal areas at —23.4 and —17.6 parts per million (p.p.m.) relative to phosphoric acid. The infrared spectrum had bands at 1266 and 1258 cm.⁻¹, indicating the presence of two phosphoryl groups. The compound analyzed as follows:

|  | Found | Calc'd for $C_{15}H_{21}Cl_5O_6P_2S_2$ |
|---|---|---|
| Percent C | 30.1 | 30.1 |
| Percent H | 3.4 | 3.5 |
| Percent Cl | 29.5 | 29.5 |
| Percent P | 10.3 | 10.3 |
| Percent S | 10.5 | 10.7 |

Based on this information, the compound was assigned the structure,

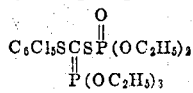

which is diethyl S-[(pentachlorophenylthio)(diethoxyphosphinyl)methyl] phosphorothioate.

*Example 2*

Another 0.02 mole portion of triethyl [(pentachlorophenylthio)(diethoxyphosphinylthio)methylene] phosphoranetrioate, prepared as in Example 1, was dissolved in 75 ml. of methylene chloride, and 0.028 mole of gaseous chlorine was added in 0.1 hour with cooling at 8–10° C. The reaction mixture was swept with nitrogen for 0.2 hour and then concentrated to 70° C./0.2 mm. to give a viscous red oil which crystallized after standing for several days. Recrystallization of about two-thirds of this product from hexane-methylene chloride gave 4.1 g. of white solid, M.P. 95–96° C., having phosphorus resonance absorption of equal areas at —15.4 and —9.8 p.p.m. relative to phosphoric acid. The compound analyzed as follows:

|  | Found | Calc'd for $C_{15}H_{20}Cl_6O_6P_2S_2$ |
|---|---|---|
| Percent C | 28.6 | 28.4 |
| Percent H | 3.4 | 3.2 |
| Percent Cl | 33.2 | 33.5 |
| Percent P | 9.7 | 9.8 |
| Percent S | 10.1 | 10.1 |

It was assigned the structure,

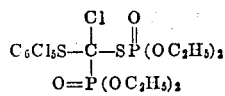

which may be named diethyl S-[(pentachlorophenylthio)-(diethoxyphosphinyl)chloromethyl] phosphorothioate.

*Example 3*

This example illustrates the preparation of the second type of phosphoranoate starting materials as well as the treatment thereof according to this invention to prepare new phosphorus compounds.

Thiophosgene, 34.5 g. (0.30 mole), was added during 0.75 hour to 152 g. (0.91 mole) of redistilled triethyl phosphite with cooling at 8–12° C. The reaction mixture was warmed to 60° C. and concentrated to 100° C./0.4 mm. to give 141.8 g. (98% yield) of an orange liquid residue, $n_D^{25}$ 1.4712. The nuclear magnetic phosphorus resonance spectrum had peaks at —53.9, —47.5, —30.4, —28.5, and —22.8 p.p.m. relative to phosphoric acid. This product was triethyl [(diethoxyphosphinyl)-(diethoxyphosphinylthio)methylene] phosphoranetrioate having the structure,

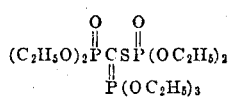

Solid pentachlorobenzenesulfenyl chloride, 19.0 g. (0.060 mole), was added to a solution of 28.0 g. (0.058 mole) of the crude triethyl [(diethoxyphosphinyl)(diethoxyphosphinylthio)methylene]phosphoranetrioate product prepared as above in 100 ml. of methylene chloride. The temperature increased from 25 to 35° C. during the addition. The reaction mixture was filtered, and the filtrate was concentrated to 65° C. to give a viscous residue that crystallized on standing overnight. Recrystallization from hexane gave 29.5 g. (69% yield) of white solid, M.P. 88–88.5° C., having phosphorus resonance peaks at −17.2 and −13.1 p.p.m. in about a 1:2 area ratio. The compound analyzed as follows:

|  | Found | Calc'd for $C_{19}H_{30}Cl_5O_9P_3S_2$ |
| --- | --- | --- |
| Percent C | 31.2 | 31.0 |
| Percent H | 4.1 | 4.1 |
| Percent Cl | 24.2 | 24.1 |
| Percent P | 12.4 | 12.6 |
| Percent S | 8.7 | 8.7 |

It has the structure,

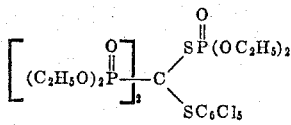

which is diethyl S-[bis(diethoxyphosphinyl)(pentachlorophenylthio)methyl]phosphorothioate.

Example 4

A 72.7 g. (0.15 mole) portion of triethyl [(diethoxyphosphinyl)(diethoxyphosphinylthio)methylene]phosphoranetrioate in 100 ml. of methylene chloride was cooled at 3–8° C. and treated with anhydrous hydrogen chloride until heat of reaction diminished. The reaction mixture was concentrated to 147° C./0.5 mm. to give 66.5 g. (97.5% of theory) of an orange liquid residue, $n_D^{25}$ 1.4670, having phosphorus resonance peaks only at −24.6 and −17.0 p.p.m. with an area ratio of 1:2. The compound analyzed as follows:

|  | Found | Calc'd for $C_{13}H_{31}O_9P_3S$ |
| --- | --- | --- |
| Percent C | 34.1 | 34.2 |
| Percent H | 7.0 | 6.9 |
| Percent Cl | 0.1 | 0.0 |
| Percent S | 7.0 | 7.0 |

It had the structure,

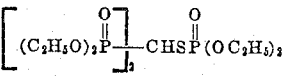

which is diethyl S-[bis(diethoxyphosphinyl)methyl]phosphorothioate.

Example 5

To a 106.6 g. (0.22 mole) portion of triethyl [(diethoxyphosphinyl)(diethoxyphosphinylthio)methylene]phosphoranetrioate there was added 17.0 g. (0.24 mole) of gaseous chlorine with cooling at 14–16° C. The reaction mixture was swept with nitrogen as it was warmed to 60° C. It was then concentrated to 100° C./mm. to give 11.5 g. (90% of theory) of ethyl chloride and 108.2 g. (100% of theory) of a red liquid residue, $n_D^{25}$ 1.4794, having phosphorus resonance peaks only at −15.6 and −9.8 p.p.m. and in an area ratio of about 1:2. It analyzed as follows:

|  | Found | Calc'd for $C_{13}H_{30}ClO_9P_3S$ |
| --- | --- | --- |
| Percent C | 31.6 | 31.8 |
| Percent H | 6.3 | 6.2 |
| Percent Cl | 7.6 | 7.2 |

The compound had the structure,

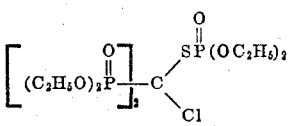

which is diethyl S-[bis(diethoxyphosphinyl)chloromethyl]phosphorothioate.

Example 6

A 46.4 g. portion of diethyl [(ethoxyphenylphosphinyl)-(ethoxyphenylphosphinylthio)methylene] phenylphosphoranedioate, prepared by reaction of thiophosgene and diethyl phenylphosphonite, was dissolved in 75 ml. of benzene and treated with hydrogen chloride at 3–9° C. until heat of reaction diminished. Concentration of the reaction mixture to 136° C./0.3 mm. gave 44.3 g. (97% of theory) of a viscous liquid having phosphorus resonance peaks at −39.8 and −33.4 p.p.m. in an area ratio of about 1:2. The product was ethyl S-[bis(ethoxyphenylphosphinyl)methyl]phenylphosphonothioate,

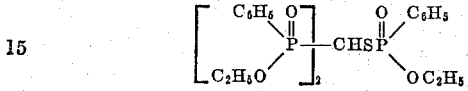

Example 7

To 269.5 g. (1.0 mole) of tris(2-chloroethyl) phosphite there was added 38.4 g. (0.33 mole) of thiophosgene in 0.2 hour at 25–55° C. The resulting reaction mixture was concentrated to 95° C./0.2 mm. to give 66 g. (99% of theory) of ethylene dichloride by-product, leaving as residue 240 g. (99.3% of theory) of tris(2-chloroethyl){[bis(2 - chloroethoxy)phosphinyl][bis(2 - chloroethoxy)phosphinylthio]methylene}phosphoranetrioate.

A 74.5 g. (0.103 mole) portion of tris(2-chloroethyl)-{[bis(2 - chloroethoxy)phosphinyl][bis(2 - chloroethoxy)phosphinylthio]methylene}phosphoranetrioate, prepared as indicated above, was placed in a reaction vessel and then 20.4 g. (0.1 mole) of trichloromethanesulfenyl chloride was added. The resulting mixture was warmed to 75° C. to insure complete reaction and then concentrated to 80° C./0.2 mm. to give as residue bis(2-chloroethyl) S-{bis[bis(2 - chloroethoxy)phosphinyl](trichloromethylthio)methyl}phosphorothioate.

Example 8

A 72.5 g. (0.10 mole) portion of tris(2-chloroethyl)-{[bis(2 - chloroethoxy)phosphinyl][bis(2 - chloroethoxy)phosphinylthio]methylene}phosphoranetrioate was diluted with 75 ml. of carbon tetrachloride and then treated with anhydrous hydrogen chloride until the solution was saturated and heat of reaction was no longer evident. The resulting reaction mixture was concentrated to 100° C./0.2 mm. There was thus obtained as residue 67.2 g. of bis(2-chloroethyl) S-{bis[bis(2-chloroethoxy)-phosphinyl]methyl}phosphorothioate,

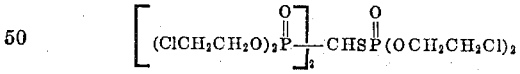

It had nuclear magnetic phosphorus resonance peaks at −25.4 and −17.2 p.p.m. in about a 1:2 area ratio.

Example 9

A 5.0 g. portion of methyl [(phenylthio)(diphenylphosphinylthio)methylene]diphenylphosphoranoate was dissolved in 50 g. of benzene, and the solution was stirred and cooled at 4–5° C. as hydrogen chloride was added until the solution was saturated. Concentration of the reaction mixture to 60° C./0.1 mm. gave a viscous tan oil that was substantially S-[(phenylthio)(diphenylphosphinyl)methyl]diphenylphosphinothioate.

Example 10

For this example, S-[bis(diethoxyphosphinyl)methyl]-diethylphosphorothioate was tested for insecticidal activity using the following test procedure.

In general, the scope of this test involves observation for evidence of contact poison activity against various stages of the two-spotted spider mite, *Tetranychus telarius*, present on foliage (bean) at the time of treatment (with a dilute, aqueous spray preparation).

For this test, 0.1 cc. of liquid or 0.1 g. of solid test chemical is dissolved or suspended in 10 ml. of acetone to make a 1% concentrate. The acetone solution is then transferred to a 200 ml. Erlenmeyer flask and 3 drops of "Tween 20" (polyethylene sorbitan monolaurate) added and mixed with the sample. One hundred cc. of tap water are then added to make a 1/1000 or 0.1% preparation. Vigorous swirling for 15 seconds completely mixes the preparation. The emulsion or suspension is then poured into a 10 x 4½ x 3 cm. museum jar. Stems of bean bearing mite infested leaves are dipped and set aside in their respective holding blocks. When dry, the mite tests are set in the greenhouse for one week after which mortality observations are made.

Using this test procedure it was found that S-[bis(diethoxyphosphinyl)methyl]diethyl phosphorothioate, diluted to .013% gave the following percent kills for the stated development stages of the two-spotted spider mite, *Tetranychus telarius*.

7 days after treatment:

| Stage— | Percent kill |
|---|---|
| Mobile | 100 |
| Resting | 100 |
| Ova | 100 |

In other tests of the same compound it was found to kill 50% of mosquito larvae, *Aëdes aegypti*, when diluted to 10 parts per million (p.p.m.), and 60% of flour beetle, *Tribolium casteneum*, at 1% concentration.

*Example 11*

For this example, S-[(p-chlorophenylthio)(diethoxyphosphinyl)methyl]diethyl phosphorothioate was tested for insecticidal activity in a manner similar to that described in Example 10, and was found to be 100% effective as a miticide in primary tests at 0.1% concentration.

In secondary screening, the compound was found to have the following indicated percent kill at the indicated concentration against the recited stages of the mite, *Tetranychus telarius*.

| Stage: | Percent kill at .0063% |
|---|---|
| Mobile | 100 |
| Resting | 100 |
| Ova | 100 |
| Residual activity | 100 |

Further, insecticidal activity of the compound was found to be 30% kill against the Mexican bean beetle, *Epilachna varivestis* Mulsant at a concentration of .004% when applied in a systematic test to bean foliage.

*Example 12*

For this example, the compound S-[(pentachlorophenylthio)(diethoxyphosphinyl)chloromethyl] diethyl phosphorothioate, was tested for contact poison activity against adults of the plum curculio, *Conotrachelus nenuphar*.

The test is conducted using the following procedure: twelve adult plum curculio, *Conotrachelus nenuphar*, of mixed sexes, two to six weeks of age, are counted into ventilated plastic tubes and held for treatment. The test solution is prepared by dissolving 100 mg. of chemical in 10 ml. of acetone to give a 0.1% on 10μg./μl. solution. A ¼ cc. hypodermic syringe is filled with the test solution and placed in a device calibrated to deliver one microliter of test solution from the syringe needle upon actuation. The plastic tube containing the test specimens is immersed in a beaker filled with $CO_2$ gas for sufficient time to achieve anesthetization. When this occurs, the adult beetles are poured onto a receptacle, picked up individually with forceps and treated on the thorax with one microliter of test solution. After treatment, the beetles are placed within a ventilated plastic holding tube, along with a section of apple to serve as food until the mortality observations are made 24 hours after treatment.

Using this test procedure, the compound, S-[(pentachlorophenylthio)(diethoxyphosphinyl)chloromethyl] diethyl phosphorothioate, gave 100% kill of the plum curculio at concentrations down to and including 0.063% (0.063 μg./adult beetle).

Reasonable variation and modification of the invention as described are possible, the essence of which is that there have been provided (1) phosphinyl-substituted thiophosphorus acid esters, (2) methods for making said compounds, (3) insecticidal compositions comprising as the essential active ingredient a compound of the above type, and (4) methods for destroying insects.

I claim:

1. A compound of the formula

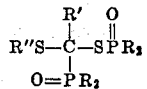

wherein R is selected from the group consisting of hydrocarbyl having from 1 to 6 carbon atoms, hydrocarbyloxy having from 1 to 6 carbon atoms, and halohydrocarbyloxy having from 1 to 6 carbon atoms; R' is selected from the group consisting of hydrogen, chlorine, bromine, alkylthio having from 1 to 15 carbon atoms, chloroalkylthio having from 1 to 15 carbon atoms, bromoalkylthio having from 1 to 15 carbon atoms, phenylthio, chlorophenylthio, bromophenylthio, alkylphenylthio having a total of from 7 to 12 carbon atoms, chloroalkylphenylthio having a total of from 7 to 12 carbon atoms, and bromoalkylphenylthio having a total of from 7 to 12 carbon atoms; and R″ is selected from the group consisting of phenyl, chlorophenyl, bromophenyl, and alkylphenyl having from 7 to 12 carbon atoms.

2. Dialkyl S - [bis(dialkoxyphosphinyl)(pentachlorophenylthio)methyl] phosphorothioate, having from 1 to 6 carbon atoms in each alkyl.

3. Diethyl S - [bis(diethoxyphosphinyl)(pentachlorophenylthio)methyl] phosphorothioate.

4. A dialkyl S - [(haloarylthio)(dialkoxyphosphinyl)halomethyl] phosphorothioate wherein each alkyl has from 1 to 6 carbon atoms and each halo is selected from the group consisting of bromine and chlorine.

5. Diethyl S - [(pentachlorophenylthio)(diethoxyphosphinyl)chloromethyl] phosphorothioate.

6. A method of preparing a sulfur-containing organic phosphorus compound which comprises reacting a compound of the formula

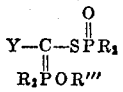

wherein R is selected from the group consisting of hydrocarbyl having from 1 to 6 carbon atoms, hydrocarbyloxy having from 1 to 6 carbon atoms, and halohydrocarbyloxy having from 1 to 6 carbon atoms; Y is selected from the group consisting of phenylthio, chlorophenylthio, bromophenylthio, alkylphenylthio having from 7 to 12 carbon atoms, and

wherein each R is as defined above; and R‴ is selected from the group consisting of aliphatic and halogen-substituted hydrocarbyl having from 1 to 6 carbon atoms, with a halogen-containing reactant selected from the group consisting of hydrogen chloride, hydrogen bromide, chlorine, bromine, alkylsulfenyl chlorides and bromides having from 1 to 15 carbon atoms, chloroalkylsulfenyl chlorides and bromides having from 1 to 15 carbon atoms, bromoalkylsulfenyl chlorides and bromides having from 1 to 15 carbon atoms, benzenesulfenyl chloride and bromide, chlorobenzene- and bromobenzenesulfenyl chlorides and bromides, alkylphenylsulfenyl chlorides and bromides having from 7 to 12 carbon atoms, chloroalkylphenylsulfenyl chlorides and bromides having from 7 to 12 carbon atoms, and bromoalkylphenylsulfenyl chlorides and bromides having from 7 to 12 carbon atoms.

7. The method according to claim 6 wherein Y is

and the halogen-containing reactant is $X_2$.

8. The method according to claim 6 wherein Y is R″S— and R″ is a chlorophenyl, R is hydrocarbyloxy having from 1 to 6 carbon atoms, R‴ is aliphatic hydrocarbyl having from 1 to 6 carbon atoms, and the halogen-containing reactant is chlorine.

9. A method for preparing diethyl S-[bis(diethoxyphosphinyl)chloromethyl] phosphorothioate which comprises reacting triethyl [(diethoxyphosphinyl)(diethoxyphosphinylthio)methylene]phosphoranetrioate with chlorine.

10. A process for preparing diethyl S-[(pentachlorophenylthio)(diethoxyphosphinyl)chloromethyl] phosphorothioate which comprises reacting triethyl [(pentachlorophenylthio)(diethoxyphosphinylthio)methylene] phosphoranetrioate with chlorine.

11. A method for preparing a dialkyl S-[bis(dialkoxyphosphinyl)chloromethyl] phosphorothioate which comprises reacting chlorine with a trialkyl [(dialkoxyphosphinyl)(dialkoxyphosphinylthio)methylene)phosphoranetrioate having from 1 to 6 carbon atoms in each alkyl group.

12. A method for preparing a dialkyl S-[chlorophenylthio)(dialkoxyphosphinyl)chloromethyl] phosphorothioate which comprises reacting chlorine with a trialkyl [(chlorophenylthio)(dialkoxyphosphinylthio) methylene] phosphoranetrioate having from 6 to 12 carbon atoms in the chloroaryl, and from 1 to 6 carbon atoms in each alkyl.

13. A method for preparing a dialkyl S-[chlorophenylthio)(dialkoxyphosphinyl) methyl] phosphorothioate which comprises reacting hydrogen chloride with a trialkyl [chlorophenylthio)(dialkoxyphosphinylthio)methylene]phosphoranetrioate.

14. A method as described in claim 13 wherein each alkyl is ethyl, and each alkoxy is ethoxy.

References Cited in the file of this patent
UNITED STATES PATENTS

| | | |
|---|---|---|
| 2,818,364 | Birum | Dec. 31, 1957 |
| 2,849,476 | McConnell et al. | Aug. 26, 1958 |
| 2,857,415 | Birum | Oct. 21, 1958 |
| 2,911,335 | Gilbert | Nov. 3, 1959 |
| 2,970,940 | Jones et al. | Feb. 7, 1961 |
| 3,042,701 | Birum | July 3, 1962 |
| 3,067,233 | Middleton | Dec. 4, 1962 |
| 3,076,012 | Schicke et al. | Jan. 29, 1963 |